(12) United States Patent
Ruffa

(10) Patent No.: US 6,980,722 B1
(45) Date of Patent: Dec. 27, 2005

(54) MULTI-LAYER FLEXIBLE OPTICAL FIBER TOW CABLE FOR MEASURING WATER TEMPERATURE

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/789,569

(22) Filed: Feb. 25, 2004

(51) Int. Cl.$^7$ .............................................. G02B 6/44
(52) U.S. Cl. ....................... 385/111; 385/113; 385/104
(58) Field of Search ..................... 385/113, 103, 104, 385/111, 112

(56) References Cited

U.S. PATENT DOCUMENTS

| | | | |
|---|---|---|---|
| 3,396,357 A | 8/1968 | Borg et al. | |
| 3,938,385 A | 2/1976 | Horwath | |
| 4,251,794 A | 2/1981 | Swenson | |
| 4,552,432 A * | 11/1985 | Anderson et al. ........... | 385/101 |
| 4,554,650 A | 11/1985 | Brown et al. | |
| 4,671,611 A | 6/1987 | Allemand et al. | |
| 4,992,993 A | 2/1991 | Chambers | |
| 5,122,641 A | 6/1992 | DeChurch | |
| 5,126,978 A | 6/1992 | Chaum | |
| 5,198,662 A | 3/1993 | Yamaguchi et al. | |
| 5,212,755 A | 5/1993 | Holmberg | |
| 5,224,190 A | 6/1993 | Chu et al. | |
| 5,313,185 A | 5/1994 | DeChurch | |
| 5,468,913 A | 11/1995 | Seaman et al. | |
| 5,625,605 A | 4/1997 | Sullivan et al. | |
| 5,742,559 A | 4/1998 | Marschall et al. | |
| 6,072,928 A | 6/2000 | Ruffa | |
| 6,088,297 A | 7/2000 | Stottlemyer | |
| 6,147,931 A | 11/2000 | Seaman et al. | |
| 2002/0044750 A1 * | 4/2002 | Ma et al. ..................... | 385/113 |
| 2002/0159726 A1 * | 10/2002 | Brown et al. ............... | 385/109 |

* cited by examiner

Primary Examiner—Chandrika Prasad
(74) Attorney, Agent, or Firm—Michael P. Stanley; James M. Kasischke; Jean-Paul Nasser

(57) ABSTRACT

A tow cable in which the temperature of the cable is measurable by the use of multiplexing capability intrinsic to optical fibers in which the optical fibers are positioned at the center of the tow cable and wound as part of two layers of surrounding strength wires. The optical fibers of the two layers intersect a vector extending radially from the optical fiber at the center to an outer surface of the tow cable. Light signals emitted from a multiplexer to positions along the optical fibers, in which the positions intersect the vector, return light signals from the positions to provide measurements that in conjunction with a data processor further provide temperature measurement of the outer boundary of the tow cable.

14 Claims, 5 Drawing Sheets

MULTI-LAYER FLEXIBLE OPTICAL FIBER TOW CABLE FOR MEASURING WATER TEMPERATURE

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

This continuation-in-part application claims the benefit of co-pending U.S. Patent Application Ser. No. 09/814,487 entitled "Instrumented Fiber Optic Tow Cable" filed on Mar. 20, 2001 by Anthony A. Ruffa who is the same and sole applicant of this application.

BACKGROUND OF THE INVENTION (1) Field of the Invention

The present invention relates to arrays towed through the water by vessels and more particularly to an improved tow cable for the arrays in which the temperature at various radii of the tow cable is measurable thereby self-calibrating the tow cable to account for the heat-dissipation of the tow cable in order to measure the temperature of the water surrounding the tow cable.

(2) Description of the Prior Art

In naval operations, an array is towed behind a vessel for gathering information, such as the location of enemy vessels or the depth of the ocean. A typical array comprises an exterior hose wall fabricated from rugged, insulated material, and a plurality of information gathering wires communicating with acoustical sensors disposed within the protective hose wall. The conducting wires or optical fibers of the towed array transmit information via the tow cable to a microprocessor within the vessel for a readout of gathered data.

In addition to transmitting information, the tow cable also powers the array. Since the conducted power generates heat, the conducted power impacts the temperature of the cable and the water surrounding the cable. Further measurements that rely on the surrounding water temperature such as a sound velocity profile, can therefore be impacted by temperature variances along the length of the tow cable. Since no segment of the tow cable or only a minimal portion of the tow cable can be accessed on surface vessels, an accurate temperature measurement at different points along the length of the tow cable is difficult to discern after the tow cable is deployed or "let out" from the winch of the array handling system.

In the art, various methods and devices are employed to measure the temperature of the tow cable and the surrounding water column. In Seaman et al. (U.S. Pat. No. 6,147,931), an apparatus for providing a temperature profile of a towed sonar array is disclosed. In the cited reference, the tow cable for the array comprises a central cable and a protective outer jacket. Thermistors are disposed at spaced positions along the outer jacket and connect to conductors embedded in the outer jacket. The conductors terminate onboard ship to provide continuous signals representing temperatures at various ocean depths.

While thermistors can be positioned along the length of the tow cable to determine the temperature of the water, this use of thermistors is limited in its practical application. In a first example, using a high number of thermistors is impractical for a tow cable that can be as long as 8000 feet. Since each thermistor requires its own pair of conductors, the high number of thermistors can significantly increase the tow cable diameter over the length of the tow cable. In a second example, the technology of the cited reference is not easily transferable to the tow cable because of the strain encountered by the tow cable at the curvature of the cable to the winch of the towed array handling system. A separate protective band for the thermistor, as disclosed by the cited reference, is susceptible to detachment during repeated use of the tow cable such that the thermistor is easily exposed to these strains with the result of inaccurate information gathering if the thermistors are damaged.

In Yamaguchi et al. (U.S. Pat. No. 5,198,662), a measuring system measures temperature distribution in water using an optical fiber. In the cited reference, the optical fiber is positioned in a central pipe sealed by filler material. Although, the optical fiber positioned in this manner can determine the temperature of the proximate water column, the positioning of optical fibers as temperature sensors can be improved.

An improvement to the positioning of sensors for measuring temperature would be the ability to gather measurements at varying radii of the cable rather than only at the center of the cable. Gathering measurements at varying radii along a common vector from the center of the tow cable increases the accuracy of temperature measurements of the surrounding water column.

SUMMARY OF THE INVENTION

Accordingly, it is a general purpose and primary object of the present invention to provide a tow cable in which temperature measurements at various radii of the tow cable are attainable thereby self-calibrating the tow cable to account and correct for the heat-flow in the radial direction in order to measure the temperature of the water surrounding the tow cable.

It is a further object of the present invention to provide a tow cable in which temperature measurements at various radii of the tow cable and along a common vector extending from a center of the tow cable are attainable.

It is a still further object of the present invention to provide a tow cable which compensates for the strain encountered by the tow cable especially at the winch of the towed array handling system.

To attain the objects described, there is provided a tow cable in which the temperature of the tow cable is measured by the use of multiplexing capability intrinsic to optical fibers in which the optical fibers are positioned at the center of the tow cable and separately wound as part of two layers of surrounding strength wires. During measurement, light signals are emitted from a multiplexer aboard the towing vessel to positions along the optical fibers in which the positions are intersections of a vector extending radially from a longitudinal axis to an outer surface of the tow cable. The returning light signals from the positions provide measurements that in conjunction with a data processor further provide measurement of the outer boundary temperature of the tow cable. The outer boundary temperature of the tow cable is determinant of the surrounding water column temperature. Sound velocity profiles are easily derived from the water column temperature by methods known to those skilled in the art.

In the manufacture of the tow cable, a steel strength member wire is substituted in one armored layer of the tow cable and another steel strength member wire is substituted in another armored layer. The steel strength member wires are substituted with armored optical fibers or bendable stainless steel tubing encompassing an optical fiber. In an additional manufacturing step, an optical fiber is positioned within stainless steel tubing as the center of the tow cable.

The above and other features of the invention, including various and novel details of construction and combinations of parts will now be more particularly described with reference to the accompanying drawings and pointed out in the claims. It will be understood that the particular devices embodying the invention are shown by way of illustration only and not as the limitations of the invention. The principles and features of this invention may be employed in various and numerous embodiments without departing from the scope of the invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
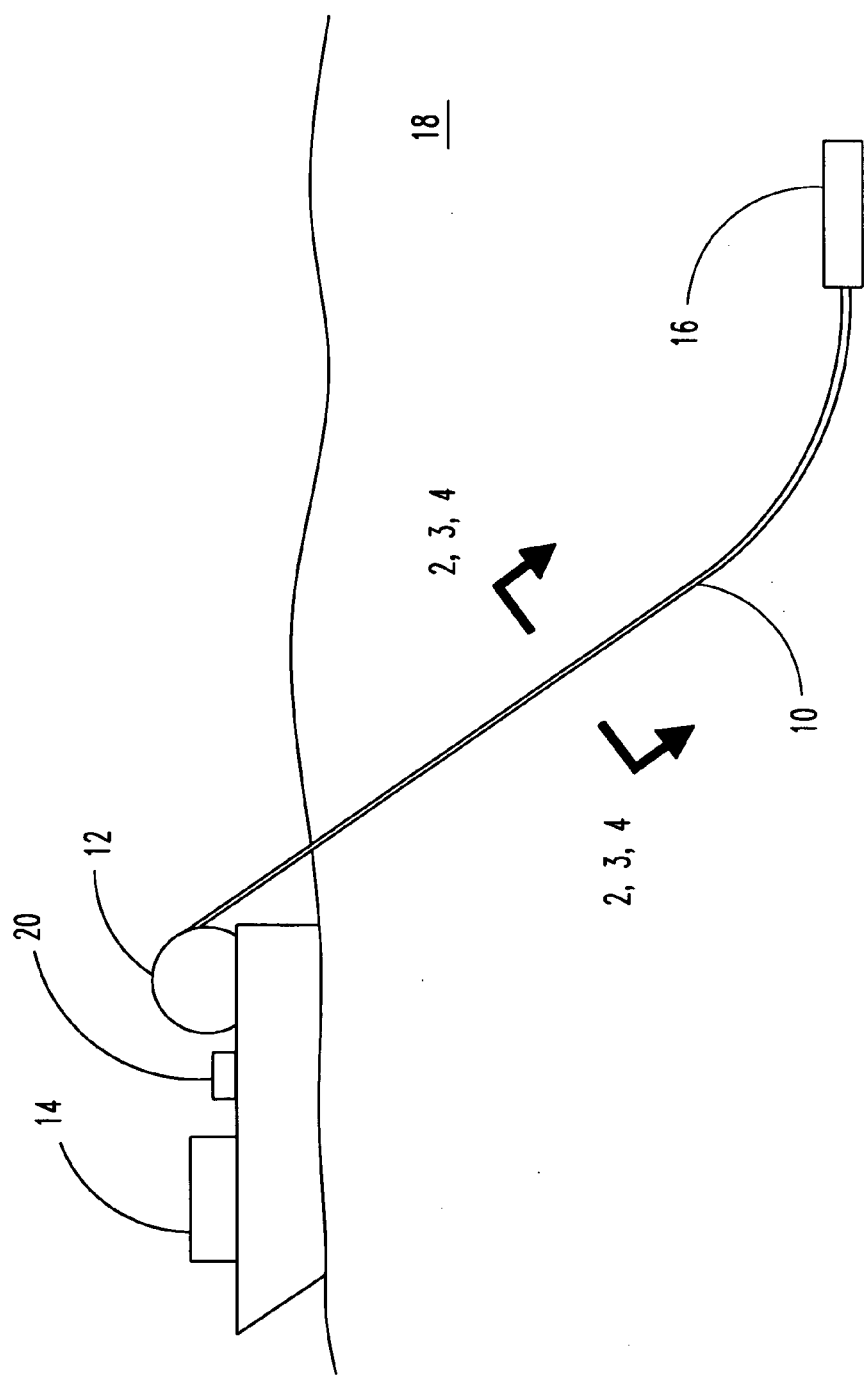
FIG. 1 depicts an arrangement view of the tow cable of the present invention secured to a towing vessel and a sensor array.

Referring now to the drawings wherein like numerals refer to like elements throughout the several views, one sees that FIG. 1 depicts an arrangement view including the tow cable 10 of the present invention let out from a winch 12 of a vessel 14 in which the tow cable tows an acoustic sensor array 16 through the ocean 18. The tow cable 10 powers the sensor array 16 and transmits measurement data from the sensor array to a multiplexer/demultiplexer 20 with data processing capability or transmits measurement data to other data processors known to those skilled in the art.

Figure 2:
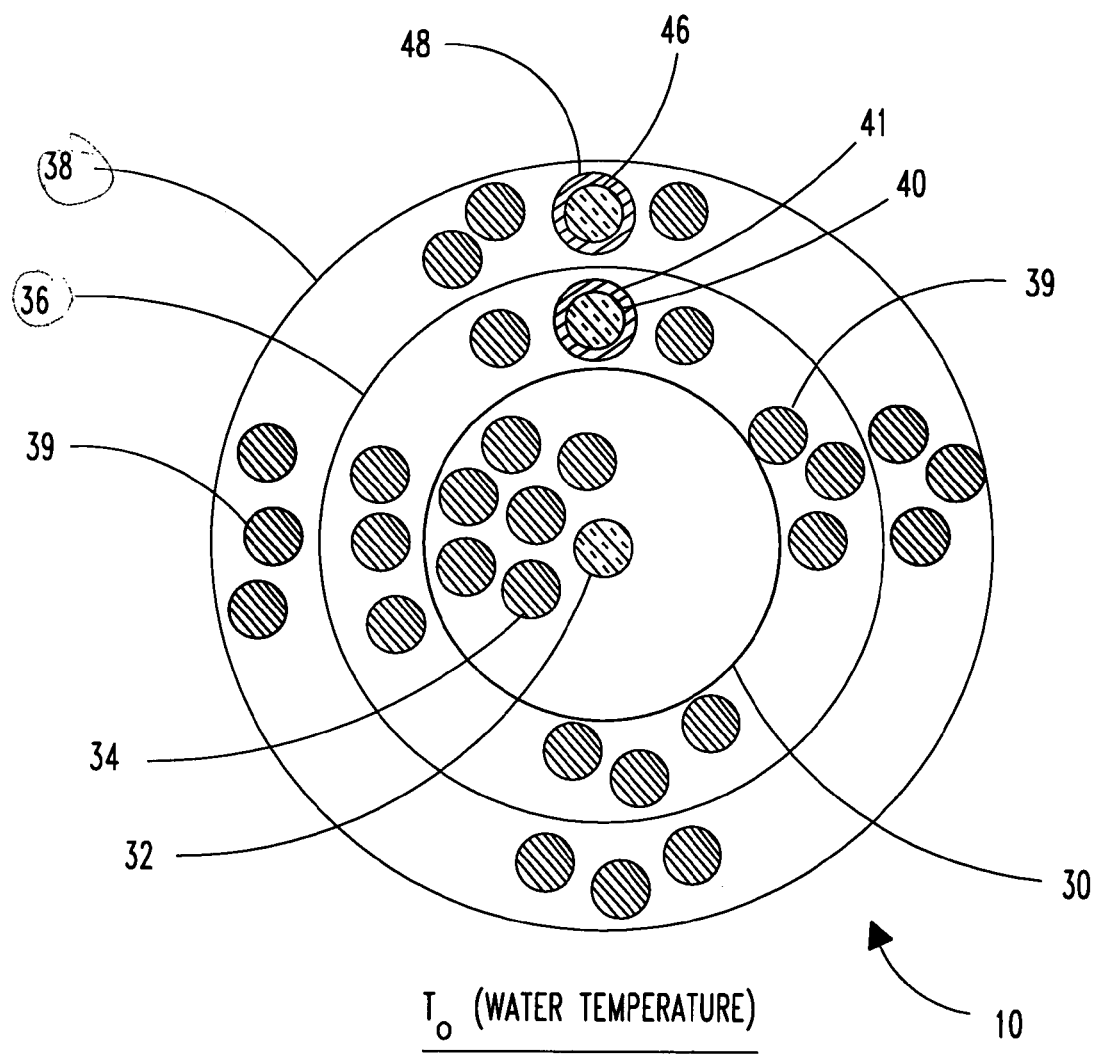
FIG. 2 depicts a cross-sectional view of the location of the optical fibers in the tow cable of the present invention with a number of strength and conducting wires of the tow cable removed for purposes of clarification and with the view taken from reference line 2–2 of FIG. 1.

As shown in the cross-sectional view of FIG. 2, the double-armored tow cable 10 includes a centrally located section 30, including at least one optical fiber 32 contained in a stainless steel tube surrounded by electrical conductors 34 (for transmitting power and signals). The optical fiber 32 preferably extends along a longitudinal axis of the tow cable 10; however, the optical fiber may extend parallel and helical to the longitudinal axis of the tow cable.

Surrounding the central section 30 are two armored layers 36 and 38 of strength wires 39. An optical fiber 40 encompassed by another stainless steel tube 41 or an armored optical fiber 42 of FIG. 3 replaces one of the strength wires 39 helixed around the section 30 as the first armored layer 36. An optical fiber 46 of FIG. 2 encompassed by another stainless steel tube 48 or an armored optical fiber 50 of FIG. 3 replaces another of the strength wires 39 helixed around the first armored layer 36 as the second armored layer 38. The number of steel strength wires 39 are shown in FIG. 2 and FIG. 3 for comparison and illustrative purposes wherein the actual number would be much larger and arrangement of the steel strength wires would vary.

Figure 4:
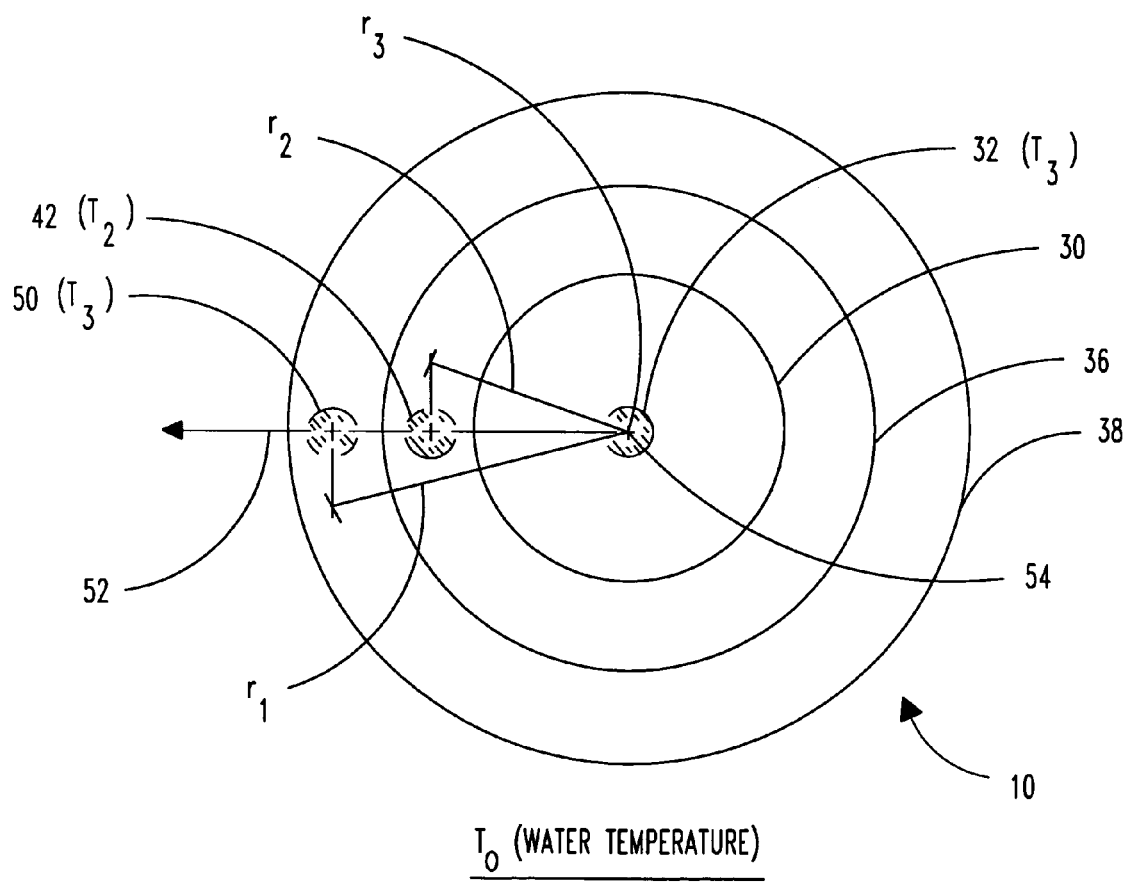
FIG. 4 depicts a cross-sectional view of the intersecting radial location of the optical fibers with the strength wires and conducting wires of the tow cable removed for purposes of clarification and with the view taken from reference line 4—4 of FIG. 1.

As shown in FIG. 4, each of the armored optical fibers 42 and 50 intersects a vector 52 extending from the optical fiber 32 of the central section 30. The vector 52 extends radially from a longitudinal axis 54 of the tow cable 10 such that the measurements derived from the group of optical fibers 32, 42 and 50 are localized. The armored optical fibers 42 and 50 also intersect additional vectors extending similar to the vector 52 with the additional vectors at various lengths of the tow cable 10 such that the temperature of the water column at various points along the tow cable is measurable. Measurements are derived from the group of optical fibers 32, 40 and 46 in a similar manner as the optical fibers of FIG. 4 with a similar positioning of the optical fibers 32, 40 and 46 as the optical fibers of FIG. 4.

Figure 5:
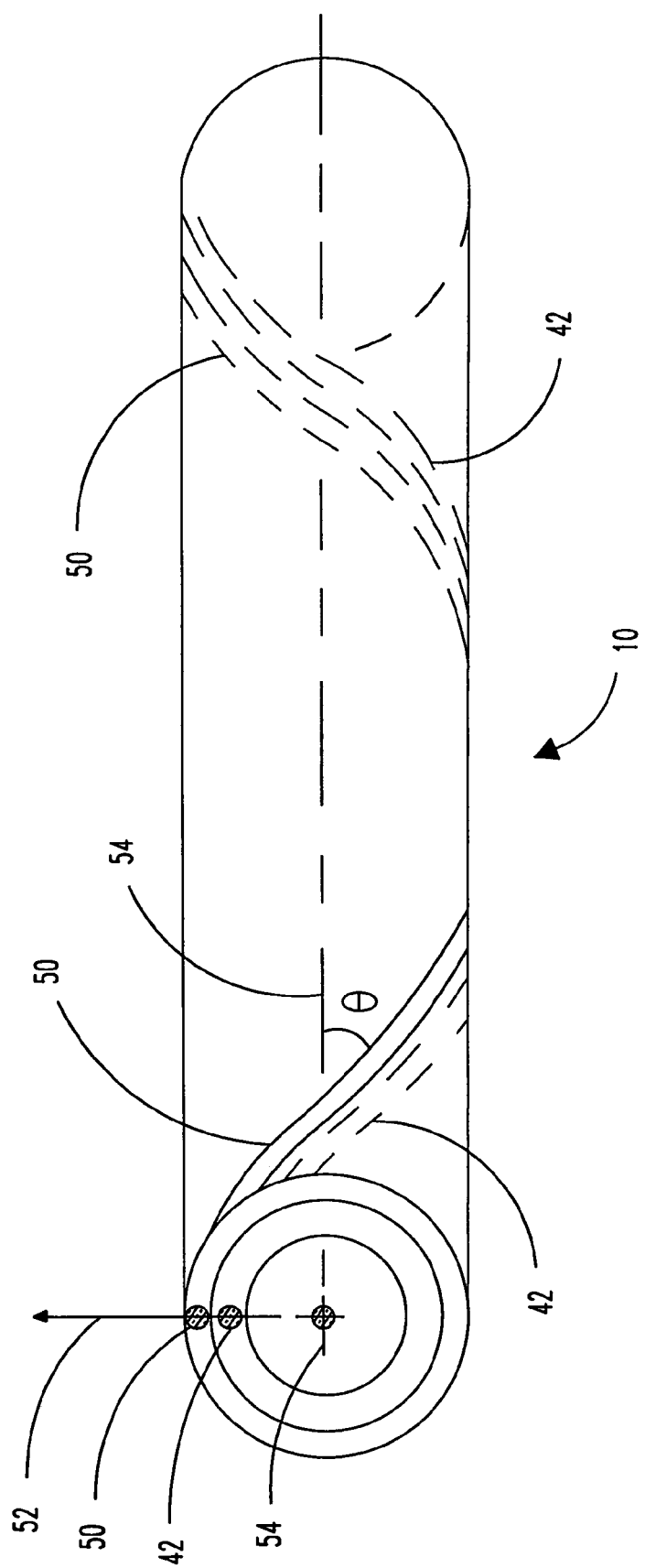
FIG. 5 depicts a perspective view of the tow cable of the present invention in which the optical fibers are wound at a helical angle with the strength wires and conducting wires of the tow cable removed for purposes of clarification.

Furthermore, the armored optical fibers 42 and 50 replace strength wires 39 that are wound around the longitudinal axis 54 at a helical angle $\theta$ depicted in FIG. 5. The optical fibers 40 and 46 are similarly wound around the longitudinal axis 54 as the optical fibers 42 and 50 shown in FIG. 5. The helical angle $\theta$ is approximately 20 degrees; however, the helical angle is based upon manufacturer's specifications (i.e.: the helical angle may decrease for larger tow cables). The placement of the armored optical fibers 42 and 50 at the helical angle $\theta$ to the longitudinal axis 54 is chosen to reduce the strain of the tow cable 10 at the large bending of the tow cable 10 encountered at the winch 12.

Figure 3:
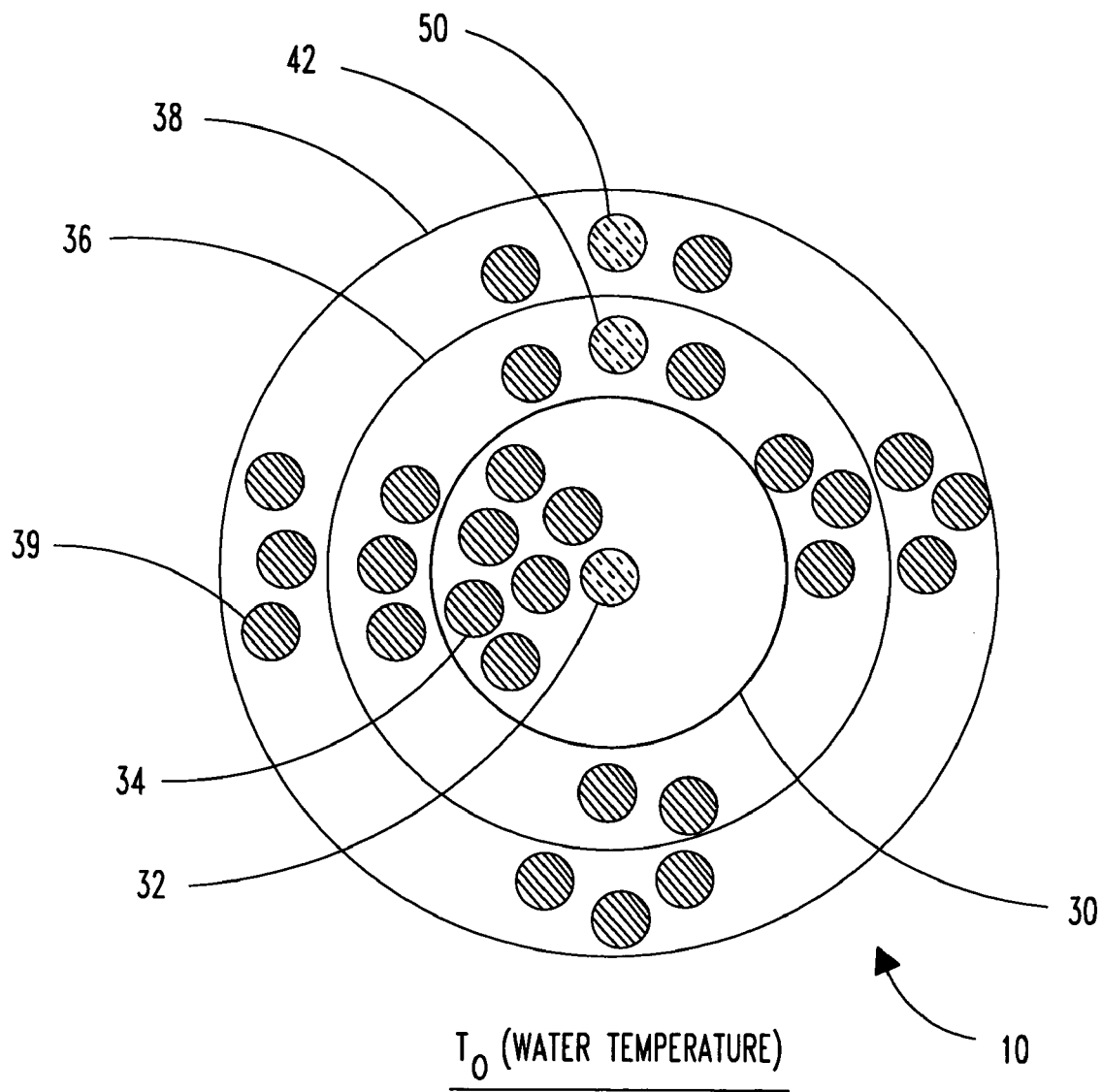
FIG. 3 depicts a cross-sectional view of the location of the optical fibers in the tow cable of the present invention with a number of strength and conducting wires of the tow cable removed for purposes of clarification and with the view taken from reference line 3—3 of FIG. 1.

In a data-gathering operation during the towing of the array 16, the multiplexer/demultiplexer 20 emits optical pulses of light through the optical fibers 32, 42 and 50 of FIG. 3 as an example. The multiplexer/demultiplexer 20 also receives backward scattered light from the optical fibers 32, 42 and 50 resulting from the emitted optical pulses of light. The back-scattered light has a component not shifted in frequency (due to Rayleigh scattering) and a component shifted in frequency (due to Raman scattering).

In terms of the wavelength distribution, the back-scattered light includes Rayleigh scattered light having the same wavelength ($\lambda_0$) and the Raman scattered light deviated 6$\Delta\lambda$ from the incident light. The Raman scattered light deviated +$\Delta\lambda$ from $\lambda_0$ is referred to as Stokes light while the Raman scattered light deviated −$\Delta\lambda$ from $\lambda_0$ is referred to as anti-Stokes light.

The location of detection data is obtained from the tow cable 10 by denoting the relation between the time (t) elapsed from the incidence of optical pulses emitted and the intensity of light detected by the multiplexer/demultiplexer 20. The data denoting the detected light intensity is inputted in a data processing portion of the multiplexer/demultiplexer 20.

Since the velocity of light in optical fibers is known, the time (t) that elapsed from the incidence of the optical pulses to the detection of a signal represents the distance from the end of the optical fibers.

The Raman scattering effects can be used to derive the temperature (T); this is well-known to one skilled in the art. The time of arrival processing described above (and also well-known in the art) determines the location of each temperature on the optical fiber.

Since the distance of emitted light can be obtained as stated above, the vector 52 of FIGS. 4 and 5 can also be established at a distance from the end of the tow cable 10. Because of the helixing of the optical fibers 42 and 50 along the-tow cable 10, the distances of emitted light for these optical fibers is slightly higher at the vector 52 and therefore the measurements based on these distances should be compressed multiplexer/demultiplexer 20 with data processing capability and accounted for at the vector 52. For example, the distance of emitted light at the optical fiber 32 would be five hundred feet while the distances at the optical fibers 42 and 50 may be five hundred and twenty-five feet and five hundred and fifty feet respectively, depending on the helix angle.

Once a distance is established and a temperature is measurable at the optical fibers 32, 42 and 50, the boundary condition of the tow cable 10 is measurable with a substantial degree of accuracy. The water temperature $T_0$ at the water column (of the ocean 18 or other surrounding fluid condition) is at or proximal to the boundary condition. Specifically, the heat going into the surface, q, at the radius $r_3$ of the tow cable 10 is resolved by the equation:

$$q = KA \frac{\partial T}{\partial r}(r_3) \cong KA \left( \frac{T_3 - T_2}{r_3 - r_2} \right)$$

assuming that $\nabla^2 T=0$ in the second armored layer 38.

In the equation, the thermal conductivity is K; A is the circumferential area at the radius $r_1$ and $$\frac{\partial T}{\partial r}$$

represents the temperature gradient measured at the radius $r_2$ and the radius $r_3$ ($r_3$=0) of FIG. 4.

Solving for Laplace's equation for heat conduction using the cylindrical coordinates intrinsic to the tow cable 10 and assuming axisymetric temperature distribution:

$$\nabla^2 T = \left[ \frac{\partial^2 T}{\partial r^2} + \frac{1}{r} \frac{\partial T}{\partial r} + \frac{\partial^2 T}{\partial z^2} \right] = 0$$

the temperature T of the surrounding water column at a length z of the tow cable 10 is resolvable.

The water temperature T is reflected by example as $T_0$ in FIGS. 2 and 3. It is found by fitting the solution to the temperatures: $T_1$ at the optical fiber 50 (alternatively the optical fiber 46 in FIG. 2); $T_2$ at the optical fiber 42 (alternatively the optical fiber 40) and $T_3$ at the optical fiber 32. If the temperature is measured at three radial locations and if the temperature is assumed axisymmetric in nature, the temperature of the tow cable 10 can be determined by solving Laplaces's equation with $T_0$ and $T_3$ as boundary conditions with an effective conductance representing the cable material.

Since $T_0$ is unknown, the problem is solved for a range of values of $T_0$, and then the value of $T_0$ is chosen that best fits the measured temperatures $T_1$ and $T_2$. Since the problem is linear, a look-up table can be pre-computed and stored so that Laplace's equation does not have to be solved in real time. As a result, the temperature $T_0$ of the surrounding water column at a length z along the tow cable 10 is resolved. Fitting to two temperatures $T_1$ and $T_2$ in a least squares sense minimizes error compared to fitting to only one interior temperature. Also, this accounts for cable heating in the center, which is reflected by the temperature $T_3$.

Thus by the present invention its objects and advantages are realized and although preferred embodiments have been disclosed and described in detail herein, its scope should be determined by that of the appended claims.

What is claimed is:

1. A flexible tow cable capable of measuring water temperature, said tow cable comprising:
   an optical fiber extending along a longitudinal axis of said tow cable;
   a section encompassing said optical fiber;
   a first plurality of strength wires extending along an outer surface of said section in a first layer;
   a first optical fiber interspersed with said strength wires and intersecting a vector extending radially from said optical fiber at the longitudinal axis to an outer surface of said tow cable;
   a second plurality of strength wires extending along an exterior of said first layer in a second layer; and
   a second optical fiber interspersed with said strength wires of said second layer and intersecting the vector;
   wherein the temperature of a surrounding water column of said tow cable is calculable based on measurements of light emitted in said optical fibers and onto the vector.

2. The flexible tow cable in accordance with claim 1 wherein said first and second optical fiber intersect additional vectors extending radially to the outer surface from said optical fiber at the longitudinal axis, the additional vectors positioned along the length of said tow cable such that the temperature of the surrounding water column at various points along said tow cable is calculable based on measurements of light emitted in said optical fibers and onto the additional vectors.

3. The flexible tow cable in accordance with claim 1 wherein said first and second optical fiber extend along said tow cable as a helix surrounding the longitudinal axis.

4. The flexible tow cable in accordance with claim 3 wherein said first and second optical fiber intersect additional vectors extending radially to the outer surface from said optical fiber at the longitudinal axis, the additional vectors positioned along the length of said tow cable such that the temperature of the surrounding water column at various points along said tow cable is calculable based on measurements of light emitted in said optical fibers and onto the additional vectors.

5. A flexible tow cable capable of measuring temperature, said tow cable comprising:
   an optical fiber extending parallel and helical to a longitudinal axis of said tow cable;
   a section encompassing said optical fiber;
   a first plurality of strength wires extending along an outer surface of said section in a first layer;

a first optical fiber interspersed with said strength wires and intersecting at least one vector extending radially from said encompassed optical fiber to an outer surface of said tow cable;

a second plurality of strength wires extending along an exterior of said first layer in a second layer; and a second optical fiber interspersed with said strength wires of said second layer and intersecting the vector;

wherein the temperature of a surrounding water column of said tow cable is calculable based on measurements of light emitted in said optical fibers and onto the vector.

6. The flexible tow cable in accordance with claim 5 wherein said first and second optical fiber intersect additional vectors extending radially to the outer surface from said encompassed optical fiber, the additional vectors positioned along the length of said tow cable such that the temperature of the surrounding water column at various points along said tow cable is calculable based on measurements of light emitted in said optical fibers and onto the additional vectors.

7. The flexible tow cable in accordance with claim 5 wherein said first and second optical fiber extend along said tow cable as a helix surrounding the longitudinal axis.

8. The flexible tow cable in accordance with claim 7 wherein said first and second optical fiber intersect additional vectors extending radially to said outer surface from said encompassed optical fiber, the additional vectors positioned along the length of said tow cable such that the temperature of the surrounding water column at various points along said tow cable is calculable based on measurements of light emitted in said optical fibers and onto the additional vectors.

9. A system of measuring temperature distribution in a water column, said system comprising:

a tow cable including an optical fiber extending along a longitudinal axis of said tow cable and encompassed by a section, a first plurality of strength wires extending along an outer surface of said section in a first layer, a first optical fiber interspersed with said strength wires, a second plurality of strength wires around said first layer in a second layer and a second optical fiber interspersed with said strength wires of said second layer wherein said first and second optical fiber intersect a vector extending radially to an outer surface from said optical fiber at the longitudinal axis;

an optical measuring means for inputting light energy into said optical fibers and for receiving return light energy from said optical fibers; and a data processing means for determining a temperature at a point along the water column based on measurements of light emitted in said optical fibers and onto the vector.

10. The system in accordance with claim 9 wherein said first and second optical fiber intersect additional vectors extending radially to the outer surface from said optical fiber at the longitudinal axis, the additional vectors positioned along the length of said tow cable such that the temperature of the water column at various points along said tow cable is calculable based on measurements of light emitted in said optical fibers and onto the additional vectors.

11. The system in accordance with claim 9 wherein said first and second optical fiber extend along said tow cable as a helix surrounding the longitudinal axis.

12. The system in accordance with claim 11 wherein said first and second optical fiber intersect additional vectors extending radially to the outer surface from said optical fiber at the longitudinal axis, the additional vectors positioned along the length of said tow cable such that the temperature of the water column at various points along said tow cable is calculable based on measurements of light emitted in said optical fibers and onto the additional vectors.

13. The system in accordance with claim 12 wherein the temperature of the water column is determined by solving LaPlace's equation and finding a resultant temperature provided by a least squares optimization between the solution of LaPlace's equations and the measurable temperatures.

14. The system in accordance with claim 13 wherein appropriate solutions to LaPlace's equation are pre-computed and stored such that the least squares optimization can be achieved quicker in comparison to solving LaPlace's equation in real time.

* * * * *